(12) United States Patent
Ishigaki et al.

(10) Patent No.: US 9,882,491 B2
(45) Date of Patent: Jan. 30, 2018

(54) POWER SUPPLY SYSTEM

(71) Applicant: TOYOTA JIDOSHA KABUSHIKI KAISHA, Toyota-shi, Aichi-ken (JP)

(72) Inventors: Masanori Ishigaki, Nagakute (JP); Kenichi Takagi, Nagakute (JP); Kenichiro Nagashita, Toyota (JP); Takahiro Hirano, Toyota (JP); Jun Muto, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 379 days.

(21) Appl. No.: 14/666,621

(22) Filed: Mar. 24, 2015

(65) Prior Publication Data

US 2015/0280579 A1  Oct. 1, 2015

(30) Foreign Application Priority Data

Mar. 26, 2014  (JP) ................. 2014-064105

(51) Int. Cl.
*H02M 3/335* (2006.01)
*H02J 7/00* (2006.01)
*H02J 7/02* (2016.01)
*B60L 3/00* (2006.01)
*B60L 3/04* (2006.01)
(Continued)

(52) U.S. Cl.
CPC ......... *H02M 3/33507* (2013.01); *B60L 3/003* (2013.01); *B60L 3/04* (2013.01); *B60L 11/1803* (2013.01); *B60L 11/1864* (2013.01); *B60L 15/007* (2013.01); *H02J 7/0018* (2013.01); *H02J 7/022* (2013.01); *H02M 3/33584* (2013.01); *B60L 2210/10* (2013.01); *B60L 2240/527* (2013.01); *B60L 2240/529* (2013.01); *H02M 2001/008* (2013.01); *H02M 2001/0074* (2013.01); *Y02T 10/645* (2013.01); *Y02T 10/7005* (2013.01); *Y02T 10/7061* (2013.01); *Y02T 10/7216* (2013.01); *Y10T 307/685* (2015.04); *Y10T 307/707* (2015.04)

(58) Field of Classification Search
None
See application file for complete search history.

(56) References Cited

U.S. PATENT DOCUMENTS 7,408,794 B2  8/2008  Su
2006/0139823 A1  6/2006  Shoji et al.
(Continued)

FOREIGN PATENT DOCUMENTS

JP  2003111413 A  4/2003
JP  2006-187147 A  7/2006
(Continued)

*Primary Examiner* — Long Nguyen
(74) *Attorney, Agent, or Firm* — Andrews Kurth Kenyon LLP (57) ABSTRACT

There is provided a power supply system including a first power supply and a second power supply. The power supply system includes a power conversion circuit capable of bidirectionally sending and receiving power by bidirectional voltage conversion between the first power supply and the second power supply, converting the first voltage from the first power supply to output a third voltage and a fourth voltage, and converting the second voltage from the second power supply to output the third voltage and the fourth voltage.

18 Claims, 11 Drawing Sheets

(51) Int. Cl.
  *B60L 11/18* (2006.01)
  *B60L 15/00* (2006.01)
  *H02M 1/00* (2006.01)

(56) References Cited

U.S. PATENT DOCUMENTS

| | | |
|---|---|---|
| 2011/0198933 A1 | 8/2011 | Ishigaki et al. |
| 2014/0092639 A1* | 4/2014 | Shimada ............ H02M 3/33507 363/17 |
| 2014/0117937 A1* | 5/2014 | Cho .................... H02J 7/0068 320/128 |
| 2015/0029761 A1* | 1/2015 | Trinh .................. H02M 1/36 363/17 |

FOREIGN PATENT DOCUMENTS

| | | |
|---|---|---|
| JP | 2009055687 A | 3/2009 |
| JP | 2011-193713 A | 9/2011 |
| WO | 2013124595 A2 | 8/2013 |

* cited by examiner

POWER SUPPLY SYSTEM

RELATED APPLICATION INFORMATION

This application claims priority to Japanese Patent Application No. 2014-064105, filed on Mar. 26, 2014, the entire content of which is incorporated herein by reference.

BACKGROUND OF THE INVENTION

Field of the Invention
The present invention relates to a power supply system.
Description of the Related Art
U.S. Pat. No. 7,408,794 and Japanese Patent Laid-Open Publication No. 2006-187147 disclose power supply systems, each including a first DC power supply and a second DC power supply, power converters each having a switching circuit for DC/AC conversion connected to each DC power supply, and a transformer provided to couple between the power converters. These power supply systems can output a voltage different from a power supply voltage by boosting or lowering the voltages from a plurality of power supplies.

The power supply systems of the prior art have difficulty in making a fine adjustment of voltage as low as about 10 V because the output voltage is changed by adjusting the duty of the switching circuit. For example, it is difficult to accurately switch between 12 V and 14 V and to output an accurate voltage.

In addition, if a fault occurs in a power converter, all functions may stop, and thus such a power supply system cannot be applied to a system requiring reliability, such as an automobile.

SUMMARY OF THE INVENTION

An aspect of the present invention is a power supply system including a first power supply outputting a first voltage and a second power supply outputting a second voltage different from the first voltage, the power supply system comprising a power conversion circuit capable of bidirectionally sending and receiving power by bidirectional voltage conversion between the first power supply and the second power supply; converting the first voltage from the first power supply to output a third voltage different from the first voltage and the second voltage and to output a fourth voltage different from the first voltage, the second voltage, and the third voltage; and converting the second voltage from the second power supply to output the third voltage and the fourth voltage.

DETAILED DESCRIPTION OF THE PREFERRED EMBODIMENTS

Figure 1:
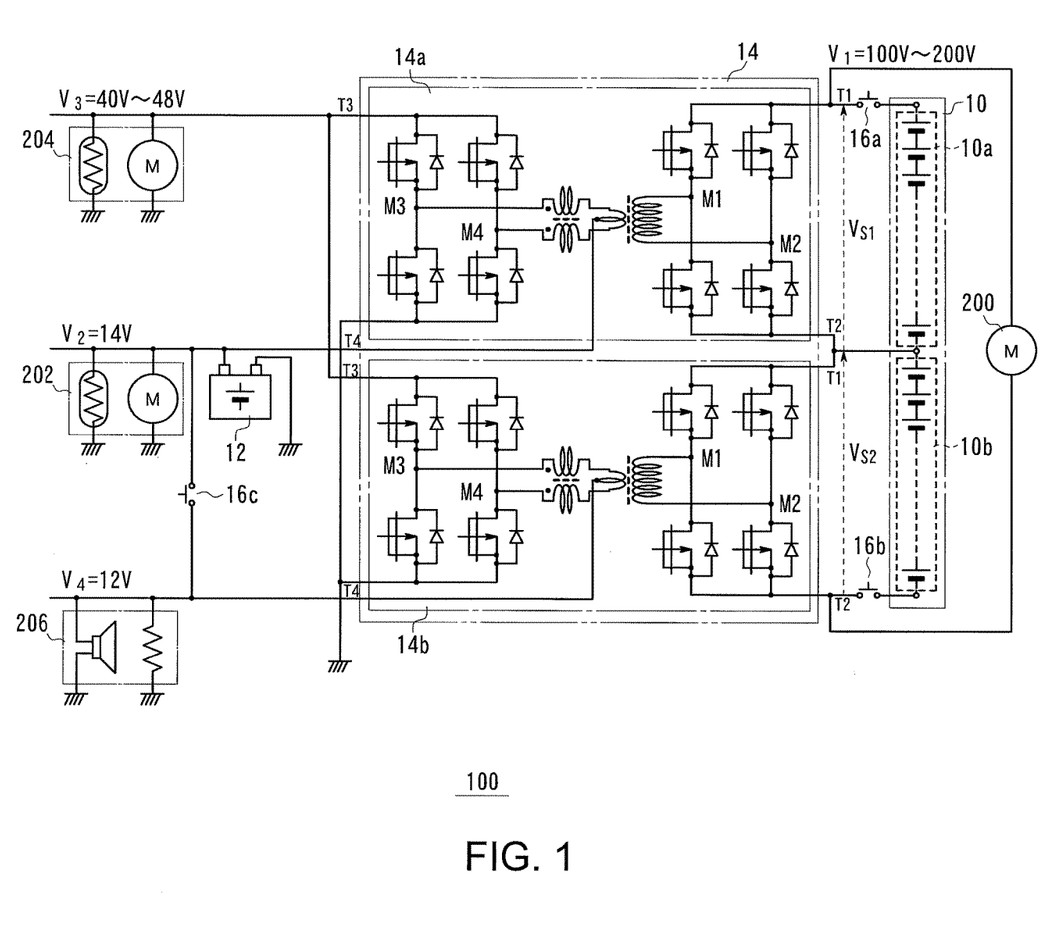
FIG. 1 is a circuit diagram illustrating a configuration of a power supply system according to an embodiment of the present invention.

FIG. 1 illustrates a power supply system 100 according to an embodiment of the present invention. The power supply system 100 includes a first power supply 10, a second power supply 12, a power conversion circuit 14, and circuit breakers 16 (16a to 16c).

The first power supply 10 is a direct current (DC) main power supply for the power supply system 100. Examples of the first power supply 10 may include a rechargeable lithium-ion battery and a rechargeable nickel-metal hydride battery. An output voltage (first voltage) $V_1$ from the first power supply 10 ranges, for example, from 100 V up to 300 V.

The first power supply 10 can be used, for example, as a battery for driving a hybrid vehicle and an electric vehicle. In order to use the first power supply 10 as a vehicle driving battery, the first power supply 10 may be connected to a vehicle driving motor generator 200 directly or through a DC/AC conversion circuit (not illustrated) such as an inverter.

According to the present embodiment, the first power supply 10 includes a first sub-power supply 10a and a second sub-power supply 10b. The first sub-power supply 10a and the second sub-power supply 10b preferably have the same or similar output capacitance and output voltage. For example, when the output voltage $V_1$ from the first power supply 10 is 200 V, each of the output voltage (first sub-voltage $V_{s1}$) from the first sub-power supply 10a and the output voltage (second sub-voltage $V_{s2}$) from the second sub-power supply 10b is preferably 100 V. More specifically, as illustrated in FIG. 1, when the first power supply 10 includes a plurality of batteries connected in series, the first power supply 10 may be divided into two groups of batteries: one is the first sub-power supply 10a and the other is the second sub-power supply 10b.

The second power supply 12 is an auxiliary power supply for the power supply system 100. Examples of the second power supply 12 may include a rechargeable lead battery. The second power supply 12 is often used as a power supply for an auxiliary load 202 with lower power than the main power supply serving as a load of the first power supply 10, and an output voltage (second voltage) $V_2$ from the second power supply 12 is, for example, 14 V.

The power conversion circuit 14 receives power from the first power supply 10 (the first sub-power supply 10a and the second sub-power supply 10b) and the second power supply 12, and generates and outputs a voltage different from the output voltages from the first power supply 10 and the second power supply 12. For example, the power conversion circuit 14 supplies power to a high power auxiliary load 204 required by recent hybrid and electric vehicles. An output voltage (third voltage) $V_3$ to the high power auxiliary load 204 is set higher than the output voltage $V_2$ from the second power supply 12, for example, ranging from 40 V up to 48 V. Additionally, the power conversion circuit 14 supplies power to a low voltage auxiliary load 206 operating at lower voltage than the auxiliary load 202. An output voltage (fourth voltage) $V_4$ to the low voltage auxiliary load 206 is set lower than the output voltage $V_2$ from the second power supply 12, for example, 12 V.

The circuit breakers 16a and 16b are switches provided for opening and closing an electrical connection between the first power supply 10 and the power conversion circuit 14. The circuit breaker 16a is provided between a high voltage side terminal of the first sub-power supply 10a and the power conversion circuit 14. The circuit breaker 16b is provided between a low voltage side terminal of the second sub-power supply 10b and the power conversion circuit 14. The circuit breaker 16c is a switch provided for opening and closing an electrical connection between a power supply line to the auxiliary load 202 and a power supply line to the low voltage auxiliary load 206. These circuit breakers 16a, 16b, and 16c can be subjected to opening and closing control independently of each other by an external control unit (not illustrated).

Here, as illustrated in FIG. 1, the power conversion circuit 14 according to the present embodiment includes a first sub-power conversion circuit 14a and a second sub-power conversion circuit 14b. Each of the first sub-power conversion circuit 14a and the second sub-power conversion circuit 14b is a multi-port converter serving as a plurality of power supplies.

Figure 2:
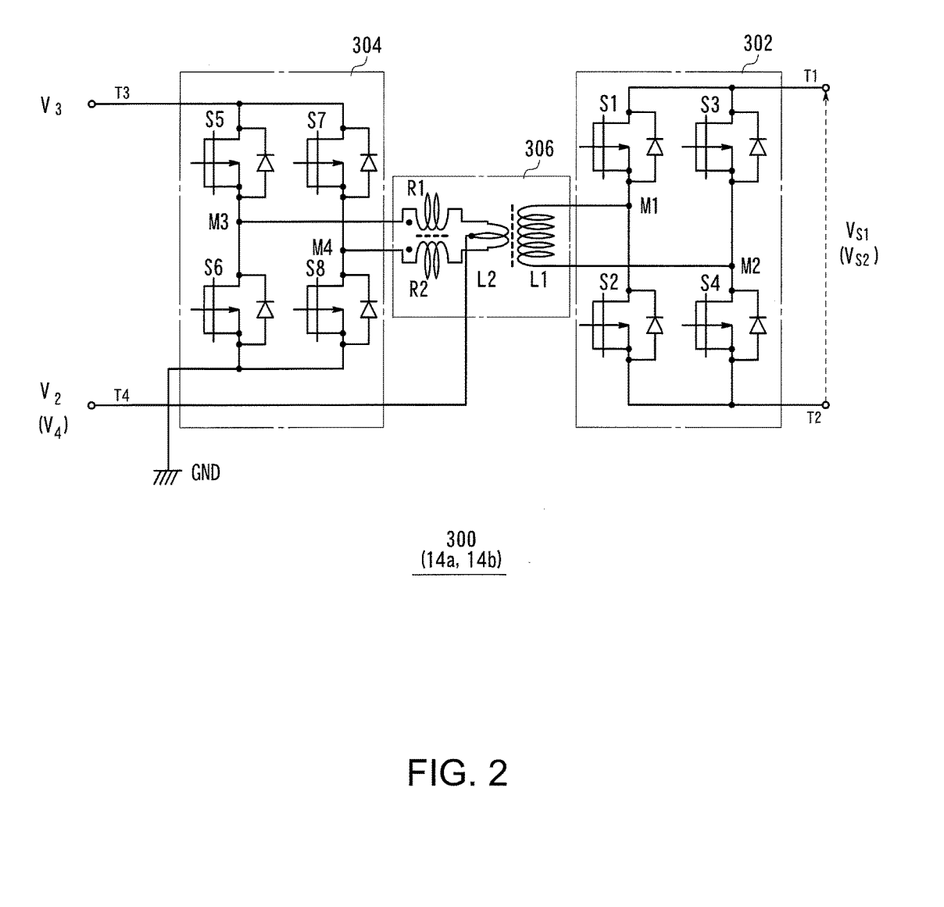
FIG. 2 is a circuit diagram illustrating a configuration of a multi-port converter according to the embodiment of the present invention.

FIG. 2 is a circuit diagram illustrating a multi-port converter 300 forming the first sub-power conversion circuit 14a and the second sub-power conversion circuit 14b. As illustrated in FIG. 2, the multi-port converter 300 includes a first bidirectional buck-boost circuit 302, a second bidirectional buck-boost circuit 304, and an isolation transformer 306. The first bidirectional buck-boost circuit 302 is connected between terminals T1 and T2 of the first power supply 10 (the first sub-power supply 10a or the second sub-power supply 10b) and a primary winding L1 of the isolation transformer 306. The second bidirectional buck-boost circuit 304 is connected between a terminal T3 of the third voltage $V_3$ and GND and a secondary winding L2 of the isolation transformer 306. Additionally, a terminal T4 of the second voltage $V_2$ (or the fourth voltage $V_4$) is drawn in the middle of the secondary winding L2 of the isolation transformer 306.

The first bidirectional buck-boost circuit 302 includes switching elements S1 to S4. A diode is connected in parallel to each of the switching elements S1 to S4. A series circuit of the switching element S1 and the switching element S2 is connected in parallel with a series circuit of the switching element S3 and the switching element S4. A middle point of connection between the switching element S1 and the switching element S2 is connected to a terminal M1 on one side of the primary winding L1 of the isolation transformer 306. A middle point of connection between the switching element S3 and the switching element S4 is connected to a terminal M2 on the other side of the primary winding L1 of the isolation transformer 306.

By controlling the switching timings of the switching elements S1 to S4, the first bidirectional buck-boost circuit 302 converts the output voltage from the first power supply 10 (the first sub-power supply 10a or the second sub-power supply 10b) to be applied to the terminals T1 and T2, and then outputs the converted voltage to the primary winding L1 of the isolation transformer 306. Additionally, the first bidirectional buck-boost circuit 302 converts a terminal voltage of the primary winding L1 of the isolation transformer 306 and then outputs the converted voltage to the first power supply 10 (the first sub-power supply 10a or the second sub-power supply 10b) connected to the terminals T1 and T2. In short, the first bidirectional buck-boost circuit 302 functions as a bidirectional buck-boost circuit capable of bidirectionally switching between input and output operations.

The second bidirectional buck-boost circuit 304 includes switching element S5 to S8. A diode is connected in parallel with each of the switching element S5 to S8. A series circuit of the switching element S5 and the switching element S6 is connected in parallel with a series circuit of the switching element S7 and the switching element S8. A middle point of connection between the switching element S5 and the switching element S6 is connected to a terminal M3 on one side of the secondary winding L2 of the isolation transformer 306. A middle point of connection between the switching element S7 and the switching element S8 is connected to a terminal M4 on the other side of the secondary winding L2 of the isolation transformer 306. Additionally, reactors R1 and R2 are provided on a high voltage side and on a low voltage side of the secondary winding L2 of the isolation transformer 306 respectively.

By controlling the switching timings of the switching elements S5 to S8, the second bidirectional buck-boost circuit 304 converts the third voltage $V_3$ to be applied to the terminal T3 and then outputs the converted voltage to the secondary winding L2 of the isolation transformer 306. Additionally, the second bidirectional buck-boost circuit 304 converts the terminal voltage of the secondary winding L2 of the isolation transformer 306 and then outputs the converted voltage to the terminal T3 as the third voltage $V_3$. In short, the second bidirectional buck-boost circuit 304 functions as a bidirectional buck-boost circuit capable of bidirectionally switching between input and output operations.

By controlling the switching timings of the switching elements S5 to S8, the second bidirectional buck-boost circuit 304 converts the second voltage $V_2$ (or the fourth voltage $V_4$) to be applied to the terminal T4 and then outputs the converted voltage to a middle point of the secondary winding L2 of the isolation transformer 306. Additionally, the second bidirectional buck-boost circuit 304 converts the terminal voltage in the middle point of the secondary winding L2 of the isolation transformer 306 and then outputs the converted voltage to the terminal T4 as the second voltage $V_2$ (or the fourth voltage $V_4$).

By controlling the switching timings of the switching elements S5 to S8, the second bidirectional buck-boost circuit 304 further converts the second voltage $V_2$ (or the fourth voltage $V_4$) to be applied to the terminal T4 and then outputs the converted voltage to the terminal T3 as the third voltage $V_3$. Additionally, the second bidirectional buck-boost circuit 304 converts the third voltage $V_3$ to be applied to the terminal T3 and then outputs the converted voltage to the terminal T4 as the second voltage $V_2$ (or the fourth voltage $V_4$).

The isolation transformer 306 outputs the voltage by mutually converting the terminal voltage of the primary winding L1 and the terminal voltage of the secondary winding L2 according to a winding number ratio N of the primary winding L1 and the secondary winding L2 by magnetic interaction. Thus, the voltage can be outputted by mutually converting the output voltage from the first power supply 10 (the first sub-power supply 10a or the second sub-power supply 10b) to be applied to the terminals T1 and T2, the second voltage $V_2$ (or the fourth voltage $V_4$), and the third voltage $V_3$.

Note that according to the present embodiment, the first sub-power conversion circuit 14a and the second sub-power conversion circuit 14b have the same configuration, but without being limited to this, any circuit may be used as long as each circuit may function as a multi-port converter independently of each other.

As illustrated in FIG. 1, the power supply system 100 includes such a multi-port converter 300 as the first sub-power conversion circuit 14a and the second sub-power conversion circuit 14b. The terminals T1 and T2 of the first sub-power conversion circuit 14a are connected to a high voltage side terminal and a low voltage side terminal of the first sub-power supply 10a respectively. Additionally, the terminals T1 and T2 of the second sub-power conversion circuit 14b are connected to a high voltage side terminal and a low voltage side terminal of the second sub-power supply 10b respectively. Additionally, the terminal T2 of the first sub-power conversion circuit 14a is connected to the terminal T1 of the second sub-power conversion circuit 14b.

The terminal T3 of the first sub-power conversion circuit 14a is connected to the terminal T3 of the second sub-power conversion circuit 14b, and the connected terminal T3 is further connected to a high power auxiliary load 204. The terminal T4 of the first sub-power conversion circuit 14a is connected to the auxiliary load 202. The terminal T4 of the second sub-power conversion circuit 14b is connected to the low voltage auxiliary load 206.

Such a configuration can maintain mutual exchange of power with redundancy. FIGS. 3A to 3D each illustrate a method of exchanging power by mutually converting a voltage of 100 V of the first power supply 10 (the first sub-power supply 10a and the second sub-power supply 10b), a voltage of 14 V of the auxiliary load 202, and a voltage ranging from 40 V up to 48 V of the high power auxiliary load 204, and a voltage of 12 V of the low voltage auxiliary load 206. Here, in the normal condition, the circuit breakers 16a and 16b are closed and the circuit breaker 16c is opened.

Figure 3A:
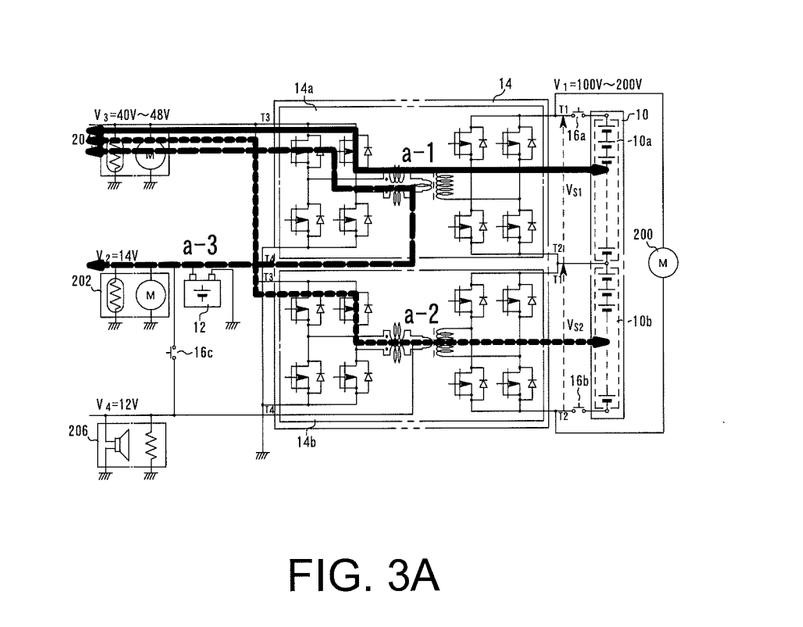
FIG. 3A is a circuit diagram illustrating a mode of bidirectionally sending and receiving power according to the embodiment of the present invention.

FIG. 3A illustrates a method of outputting a voltage ranging from 40 V up to 48 V of the high power auxiliary load 204. More specifically, power can be supplied through three lines: line a-1 supplying power from the first sub-power supply 10a, line a-2 supplying power from the second sub-power supply 10b, and line a-3 supplying power from the second power supply 12. The line a-1 starts from the first sub-power supply 10a, passing through the first bidirectional buck-boost circuit 302 of the first sub-power conversion circuit 14a, the isolation transformer 306 of the first sub-power conversion circuit 14a, the second bidirectional buck-boost circuit 304 of the first sub-power conversion circuit 14a, and reaches the high power auxiliary load 204. The line a-1 converts the voltage from 100 V to 40 V up to 48 V, and power of 40 V up to 48 V is supplied. The line a-2 starts from the second sub-power supply 10b, passing through the first bidirectional buck-boost circuit 302 of the second sub-power conversion circuit 14b, the isolation transformer 306 of the second sub-power conversion circuit 14b, the second bidirectional buck-boost circuit 304 of the second sub-power conversion circuit 14b, and reaches the high power auxiliary load 204. The line a-2 converts the voltage from 100 V to 40 V up to 48 V, and power of 40 V up to 48 V is supplied. The line a-3 starts from the second power supply 12, passing through the second bidirectional buck-boost circuit 304 of the first sub-power conversion circuit 14a, and reaches the high power auxiliary load 204, and converts the voltage from 14 V to 40 V up to 48 V, to supply power of 40 V up to 48 V. Note that power can also be supplied in the opposite direction along these lines as needed.

Figure 3B:
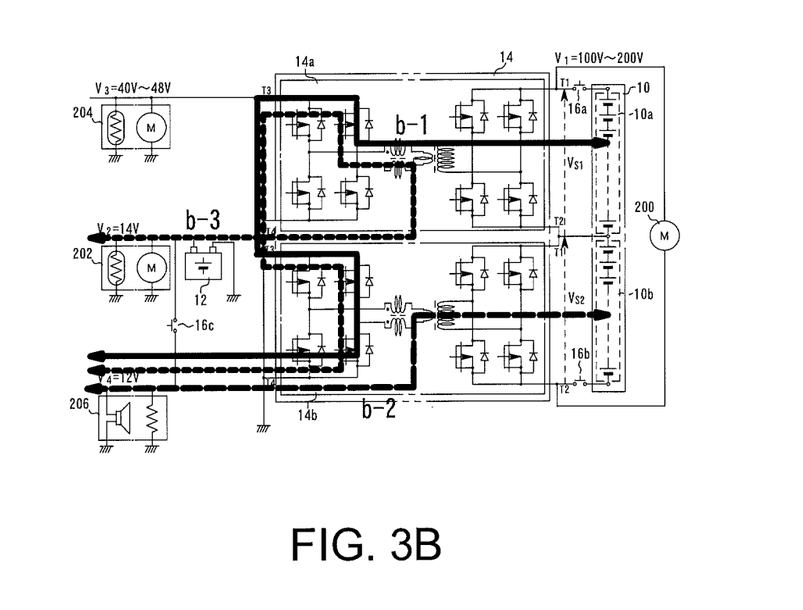
FIG. 3B is a circuit diagram illustrating a mode of bidirectionally sending and receiving power according to the embodiment of the present invention.

FIG. 3B illustrates a method of outputting a voltage of 12 V of the low voltage auxiliary load 206. More specifically, power can be supplied through three lines: line b-1 supplying power from the first sub-power supply 10a, line b-2 supplying power from the second sub-power supply 10b, and line b-3 supplying power from the second power supply 12. The line b-1 starts from the first sub-power supply 10a, passing through the first bidirectional buck-boost circuit 302 of the first sub-power conversion circuit 14a, the isolation transformer 306 of the first sub-power conversion circuit 14a, the second bidirectional buck-boost circuit 304 of the first sub-power conversion circuit 14a, and reaches the second bidirectional buck-boost circuit 304 of the second sub-power conversion circuit 14b. The line b-1 converts the voltage from 100 V to 12 V, and power of 12 V is supplied. The line b-2 starts from the second sub-power supply 10b, passing through the first bidirectional buck-boost circuit 302 of the second sub-power conversion circuit 14b, the isolation transformer 306 of the second sub-power conversion circuit 14b, and reaches the second bidirectional buck-boost circuit 304 of the second sub-power conversion circuit 14b. The line b-2 converts the voltage from 100 V to 12 V, and power of 12 V is supplied. The line b-3 starts from the second power supply 12, passing through the second bidirectional buck-boost circuit 304 of the first sub-power conversion circuit 14a, and reaches the second bidirectional buck-boost circuit 304 of the second sub-power conversion circuit 14b. The line b-3 converts the voltage from 14 V to 12 V, and power of 12 V is supplied. Note that power can also be supplied in the opposite direction along these lines as needed.

Figure 3C:
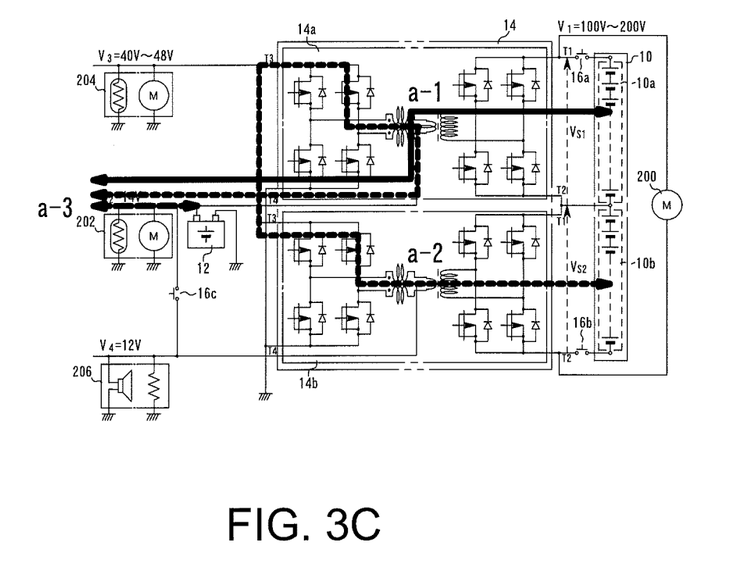
FIG. 3C is a circuit diagram illustrating a mode of bidirectionally sending and receiving power according to the embodiment of the present invention.

FIG. 3C illustrates a method of outputting a voltage of 14 V of the auxiliary load 202. More specifically, power can be supplied through three lines: line c-1 supplying power from the first sub-power supply 10a, line c-2 supplying power from the second sub-power supply 10b, and line c-3 supplying power from the second power supply 12. The line c-1 starts from the first sub-power supply 10a, passing through the first bidirectional buck-boost circuit 302 of the first sub-power conversion circuit 14a, the isolation transformer 306 of the first sub-power conversion circuit 14a, and reaches the auxiliary load 202. The line c-1 converts the voltage from 100 V to 14 V, and power of 14 V is supplied. The line c-2 starts from the second sub-power supply 10*b*, passing through the first bidirectional buck-boost circuit 302 of the second sub-power conversion circuit 14*b*, the isolation transformer 306 of the second sub-power conversion circuit 14*b*, the second bidirectional buck-boost circuit 304 of the second sub-power conversion circuit 14*b*, the second bidirectional buck-boost circuit 304 of the first sub-power conversion circuit 14*a*, the isolation transformer 306 of the first sub-power conversion circuit 14*a*, and reaches the auxiliary load 202. The line c-2 converts the voltage from 100 V to 14 V, and power of 14 V is supplied. The line c-3 connects the second power supply 12 to the auxiliary load 202 to directly supply power of 12 V. Note that power can also be supplied in the opposite direction along these lines as needed.

Figure 3D:
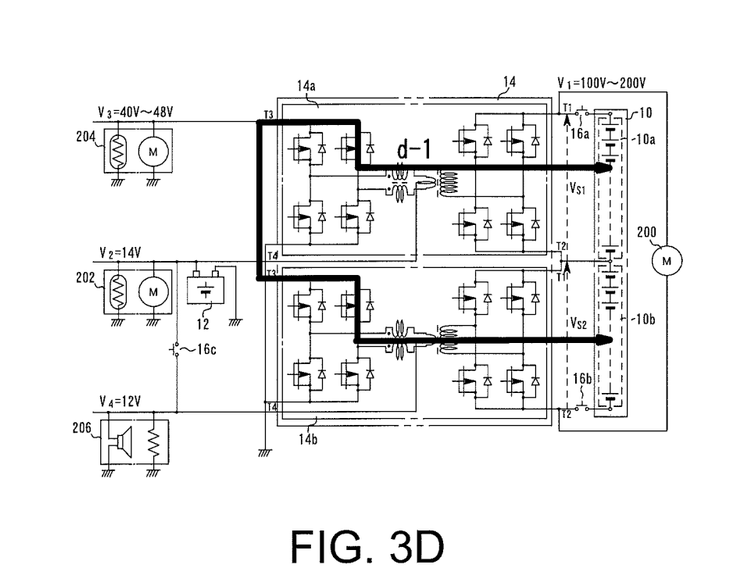
FIG. 3D is a circuit diagram illustrating a mode of bidirectionally sending and receiving power according to the embodiment of the present invention.

FIG. 3D illustrates a method of exchanging power between the first sub-power supply 10*a* and the second sub-power supply 10*b*. More specifically, the line d-1 starts from the first sub-power supply 10*a*, passing through the first bidirectional buck-boost circuit 302 of the first sub-power conversion circuit 14*a*, the isolation transformer 306 of the first sub-power conversion circuit 14*a*, the second bidirectional buck-boost circuit 304 of the first sub-power conversion circuit 14*a*, the second bidirectional buck-boost circuit 304 of the second sub-power conversion circuit 14*b*, the isolation transformer 306 of the second sub-power conversion circuit 14*b*, the first bidirectional buck-boost circuit 302 of the 14*b*, and reaches the second sub-power supply 10*b*, along which power can be supplied. Note that power can be supplied in the opposite direction.

The description will now focus on a power supply mode upon failure or termination of the power supply system 100 according to the embodiment of the present invention.

Figure 4A:
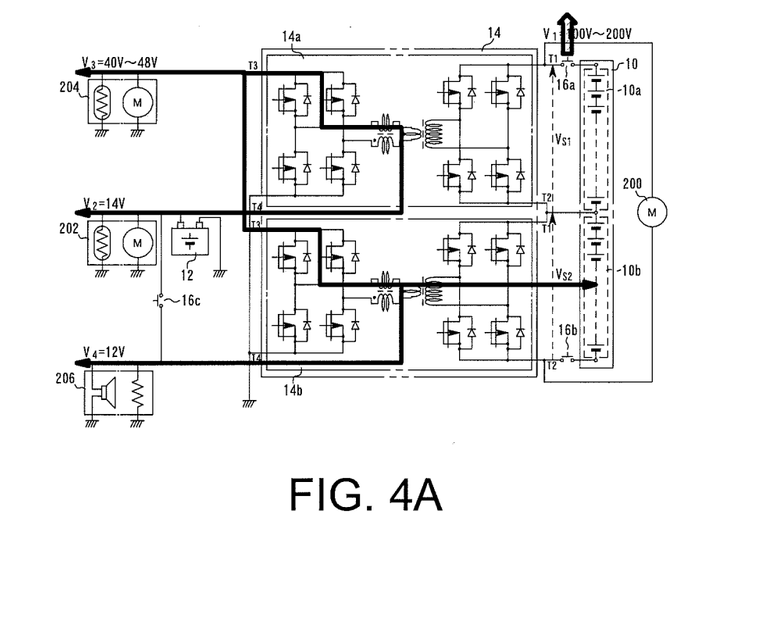
FIG. 4A is a circuit diagram illustrating a mode of exchanging power upon failure or termination of the system according to the embodiment of the present invention.

FIG. 4A is a circuit diagram for describing a method of exchanging power for the power supply system 100 when the first sub-power supply 10*a* fails. When the first sub-power supply 10*a* fails, the circuit breaker 16*a* is opened, resulting in the first sub-power supply 10*a* being isolated from the power supply system 100. As illustrated by the arrow in FIG. 4A, even if the first sub-power supply 10*a* fails, power can be sent and received between the components: the second sub-power supply 10*b*, the second power supply 12, the auxiliary load 202, the high power auxiliary load 204, and the low voltage auxiliary load 206.

Figure 4B:
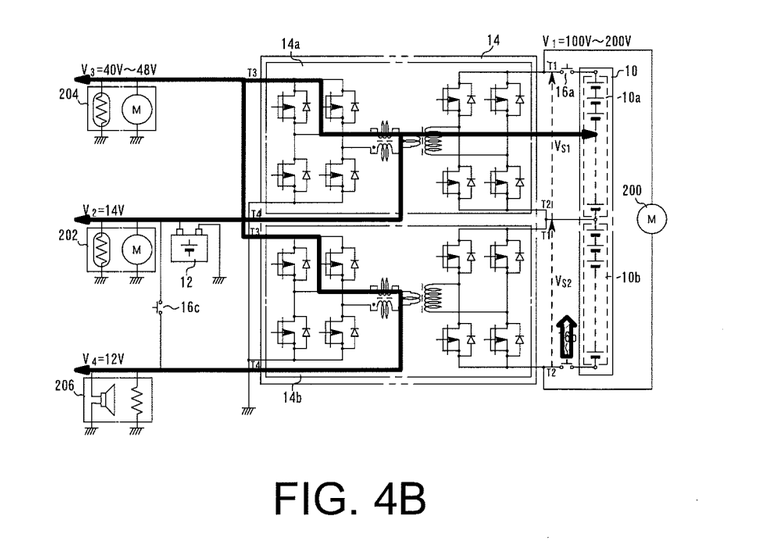
FIG. 4B is a circuit diagram illustrating a mode of exchanging power upon failure or termination of the system according to the embodiment of the present invention.

FIG. 4B is a circuit diagram for describing a method of exchanging power for the power supply system 100 when the second sub-power supply 10*b* fails. When the second sub-power supply 10*b* fails, the circuit breaker 16*b* is opened, resulting in the second sub-power supply 10*b* being isolated from the power supply system 100. As illustrated by the arrow in FIG. 4B, even if the second sub-power supply 10*b* fails, power can be sent and received between the components: the first sub-power supply 10*a*, the second power supply 12, the auxiliary load 202, the high power auxiliary load 204, and the low voltage auxiliary load 206.

Figure 4C:
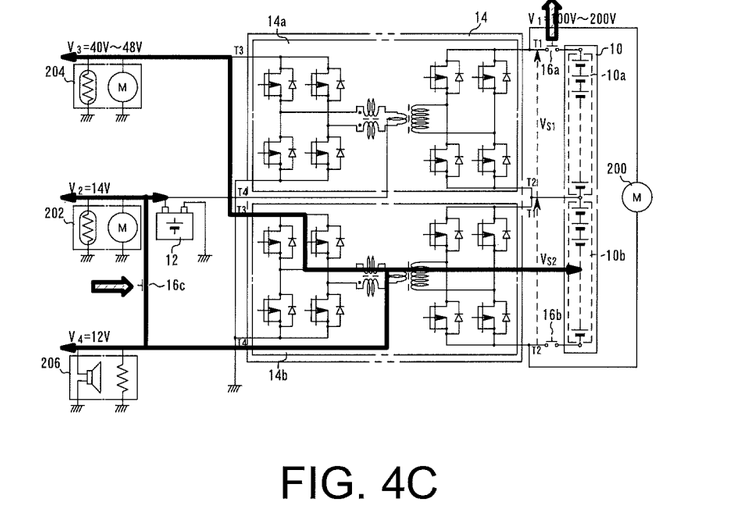
FIG. 4C is a circuit diagram illustrating a mode of exchanging power upon failure or termination of the system according to the embodiment of the present invention.

FIG. 4C is a circuit diagram for describing a method of exchanging power for the power supply system 100 when the first sub-power conversion circuit 14*a* fails. When the first sub-power conversion circuit 14*a* fails, the circuit breaker 16*a* is opened, resulting in the first sub-power supply 10*a* being isolated from the power supply system 100. Additionally, the circuit breaker 16*c* is closed, resulting in a power supply line of the auxiliary load 202 being connected to a power supply line of the low voltage auxiliary load 206. As illustrated by the arrow in FIG. 4C, even if the first sub-power conversion circuit 14*a* fails, power can be sent and received between the components: the second sub-power supply 10*b*, the second power supply 12, the auxiliary load 202, the high power auxiliary load 204, and the low voltage auxiliary load 206. Note that the power supplied to the auxiliary load 202 is not 14 V but 12 V as an emergency alternative.

Figure 4D:
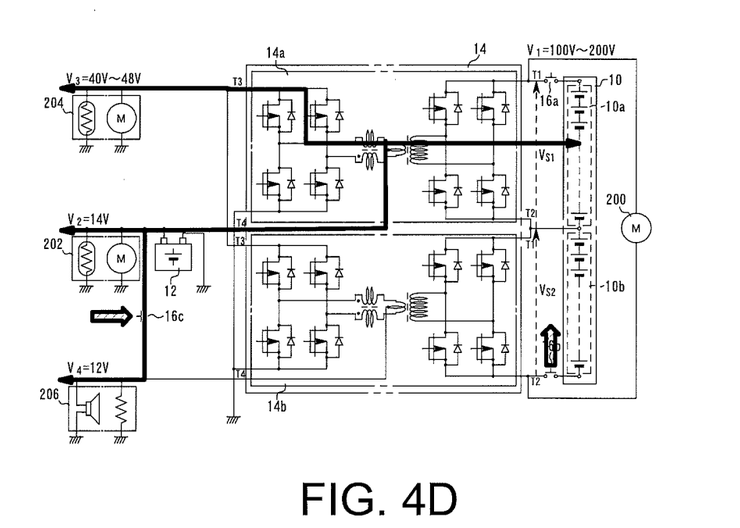
FIG. 4D is a circuit diagram illustrating a mode of exchanging power upon failure or termination of the system according to the embodiment of the present invention.

FIG. 4D is a circuit diagram for describing a method of exchanging power for the power supply system 100 when the second sub-power conversion circuit 14*b* fails. When the second sub-power conversion circuit 14*b* fails, the circuit breaker 16*b* is opened, resulting in the second sub-power supply 10*b* being isolated from the power supply system 100. Additionally, the circuit breaker 16*c* is closed, resulting in the power supply line of the auxiliary load 202 being connected to the power supply line of the low voltage auxiliary load 206. As illustrated by the arrow in FIG. 4D, even if the second sub-power conversion circuit 14*b* fails, power can be sent and received between the components: the first sub-power supply 10*a*, the second power supply 12, the auxiliary load 202, the high power auxiliary load 204, and the low voltage auxiliary load 206. Note that the power supplied to the low voltage auxiliary load 206 is not 12 V but 14 V as an emergency alternative.

Figure 4E:
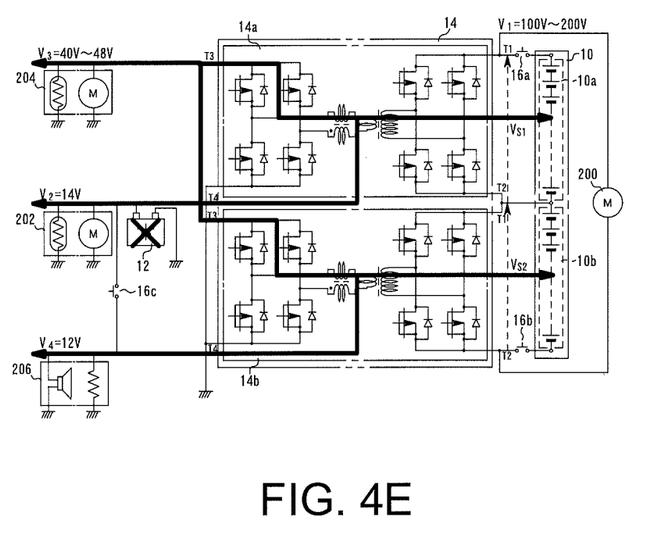
FIG. 4E is a circuit diagram illustrating a mode of exchanging power upon failure or termination of the system according to the embodiment of the present invention.

FIG. 4E is a circuit diagram for describing a method of exchanging power for the power supply system 100 when the second power supply 12 fails. When the second power supply 12 fails, the circuit breaker 16*c* is opened, resulting in the power supply line of the auxiliary load 202 being isolated from the power supply line of the low voltage auxiliary load 206. As illustrated by the arrow in FIG. 4E, even if the second power supply 12 fails, power can be sent and received between the components: the first sub-power supply 10*a*, the second sub-power supply 10*b*, the auxiliary load 202, the high power auxiliary load 204, and the low voltage auxiliary load 206.

Figure 4F:
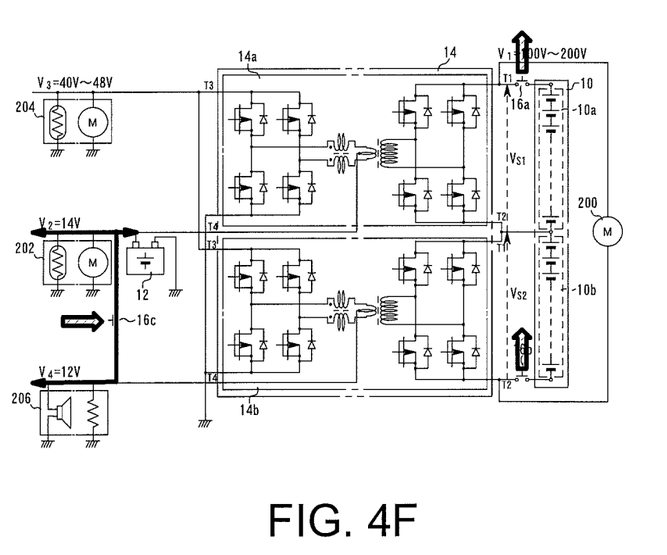
FIG. 4F is a circuit diagram illustrating a mode of exchanging power upon failure or termination of the system according to the embodiment of the present invention.

FIG. 4F is a circuit diagram for describing a method of exchanging power for the power supply system 100 when the first sub-power conversion circuit 14*a* and the second sub-power conversion circuit 14*b* fail. This corresponds to a state in which a vehicle having the power supply system 100 mounted thereon is stopped (e.g., system stop, ignition off, etc.). When the first sub-power conversion circuit 14*a* and the second sub-power conversion circuit 14*b* fail, the circuit breakers 16*a* and 16*b* are opened, and the circuit breaker 16*c* is closed. Then, power is supplied from the second power supply 12 to the auxiliary load 202 and the low voltage auxiliary load 206. The auxiliary load 202 and the low voltage auxiliary load 206 include an electronic control unit (ECU) and a security device, and hence power is supplied from the second power supply 12, which can maintain these minimum functions.

As described above, even if an abnormality or failure occurs in a circuit or a power supply of the power supply system 100 according to the present embodiment of the present invention, the abnormal or failed portion can be isolated from the power supply system 100, and hence a plurality of power supplies can be maintained with redundancy.

<First Modification>

Figure 5:
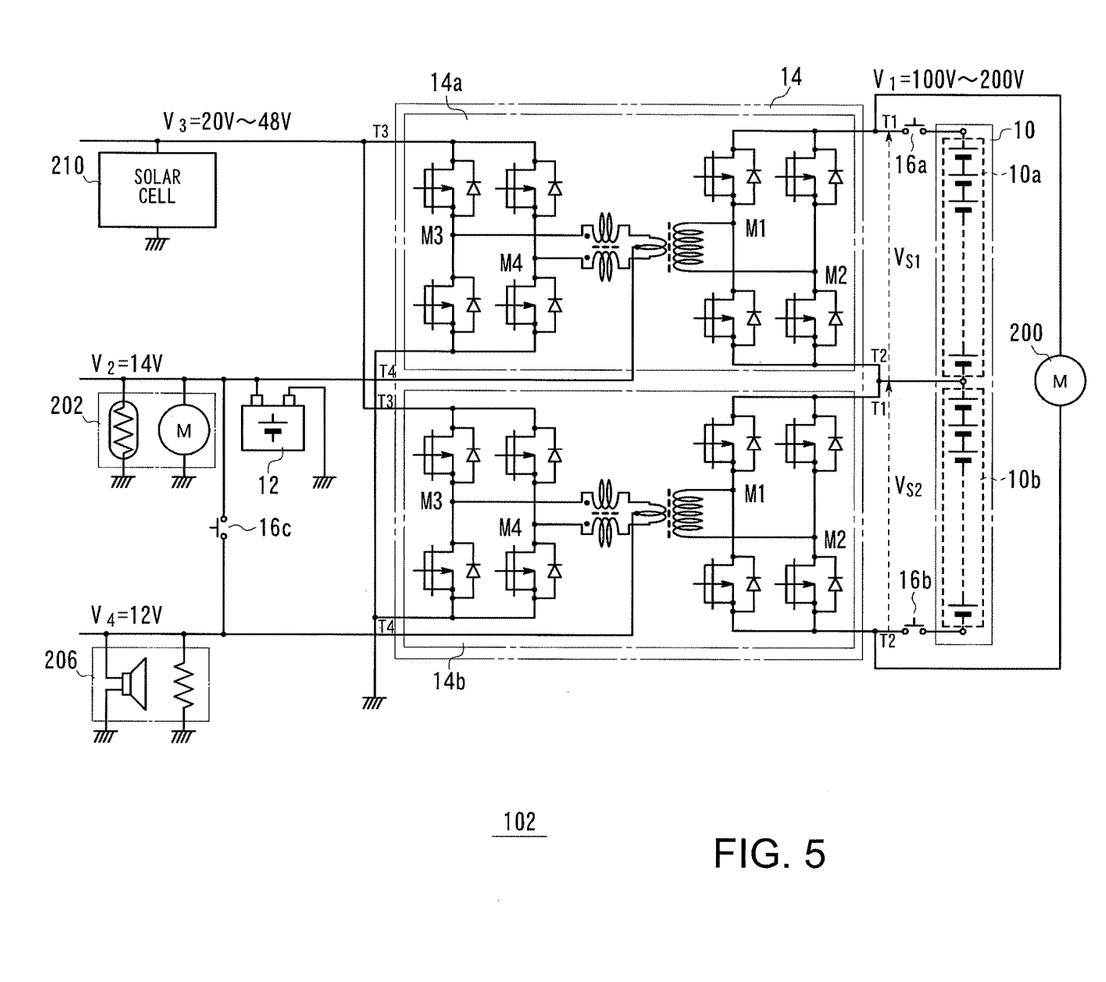
FIG. 5 is a circuit diagram illustrating a configuration of a power supply system according to a first modification of the present invention.

FIG. 5 is a circuit diagram illustrating a configuration of a power supply system 102 according to a first modification of the present invention. The power supply system 102 includes an external power generator 210 such as a solar cell instead of the high power auxiliary load 204 or together with the high power auxiliary load 204. The external power generator 210 is connected to the terminal T3 common to the first sub-power conversion circuit 14a and the second sub-power conversion circuit 14b.

In the same manner as the above described power supply system 100, the power supply system 102 can also supply power from the first sub-power supply 10a, the second sub-power supply 10b, and the second power supply 12 to the auxiliary load 202 and the low voltage auxiliary load 206. Additionally, the power supply system 102 can also supply power from the external power generator 210 to the auxiliary load 202 and the low voltage auxiliary load 206.

Further, the power supply system 102 can also supply power from the external power generator 210 to the first sub-power supply 10a, the second sub-power supply 10b, and the second power supply 12 for charging.

Figure 6:
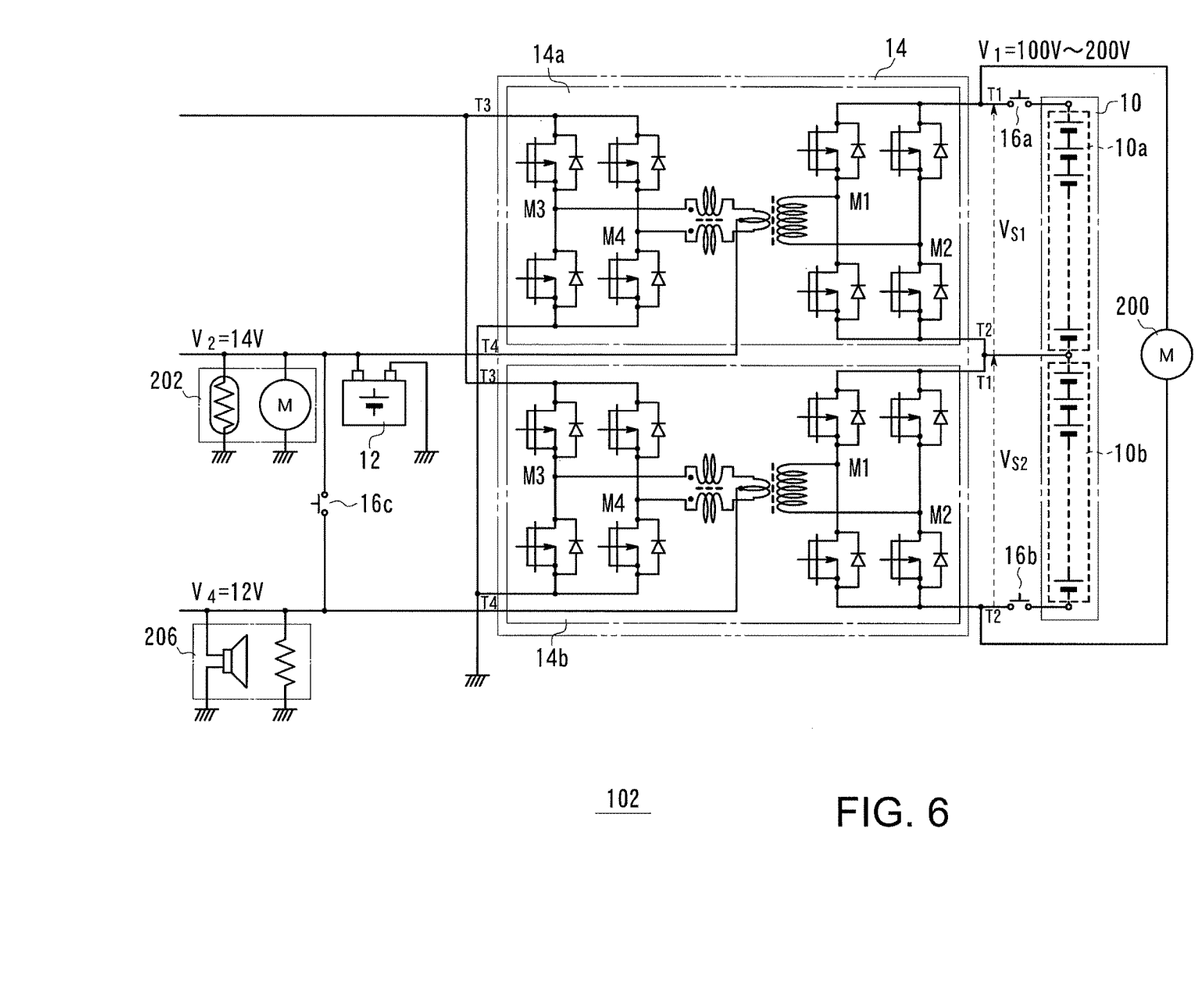
FIG. 6 is a circuit diagram illustrating a configuration of a power supply system according to the first modification of the present invention.

As illustrated in FIG. 6, for the user not requiring the external power generator 210, the terminal T3 common to the first sub-power conversion circuit 14a and the second sub-power conversion circuit 14b may be in an open state. In this case, the first sub-power supply 10a, the second sub-power supply 10b, and the second power supply 12 can be used as a power supply supplying an output voltage of 100 V, 14 V, and 12 V.

<Second Modification>

Figure 7:
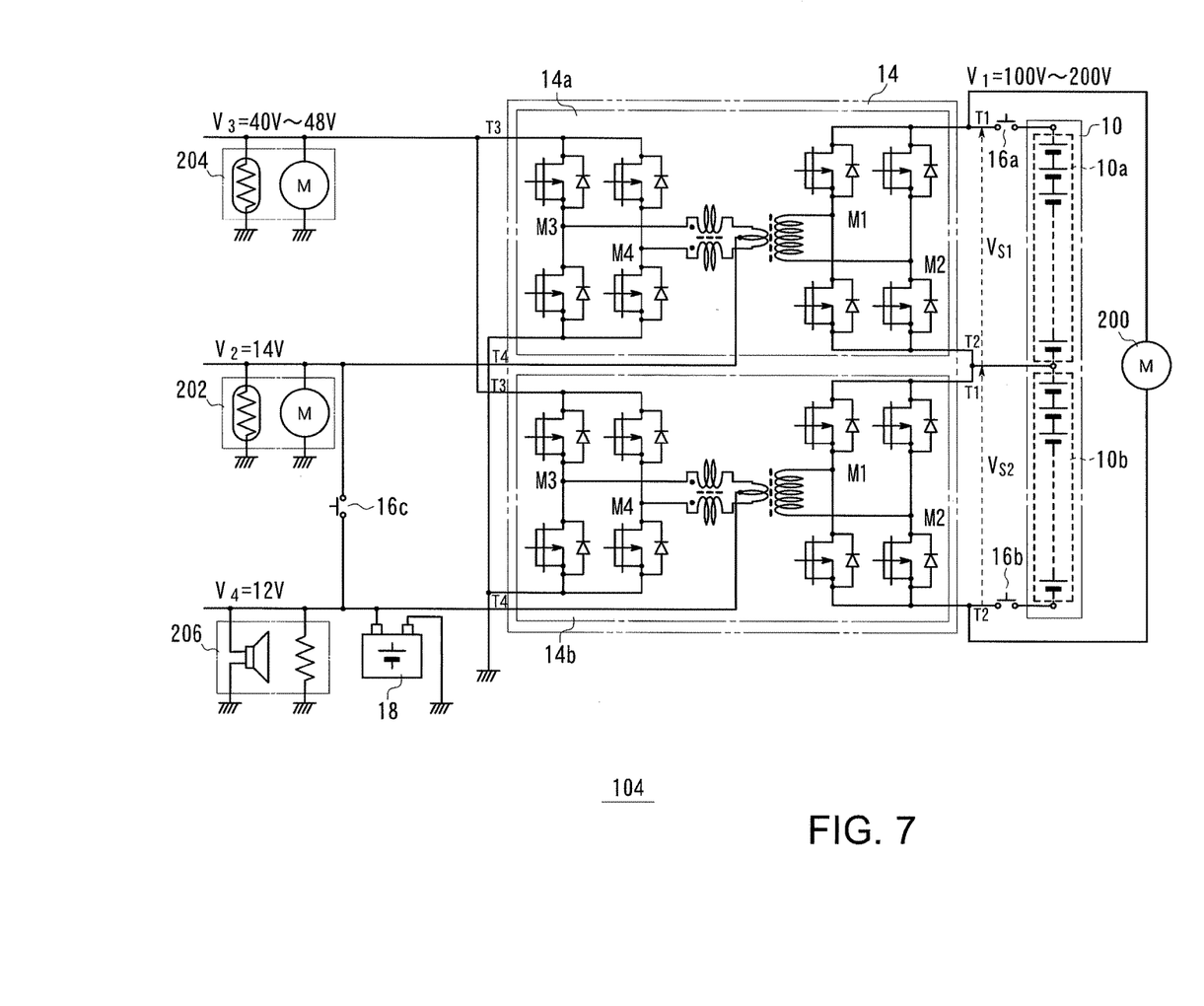
FIG. 7 is a circuit diagram illustrating a configuration of a power supply system according to a second modification of the present invention.

FIG. 7 is a circuit diagram illustrating a configuration of a power supply system 104 according to a second modification of the present invention. The power supply system 104 is configured such that a third power supply 18 instead of the second power supply 12 is connected to the power supply line of the low voltage auxiliary load 206. The third power supply 18 is preferably a power supply of the same voltage as the rated voltage of the low voltage auxiliary load 206. Examples of the third power supply 18 may include a lithium-ion battery.

In this case, when the system stops, the circuit breaker 16c may not be provided as long as the total load requiring a standby power is included in the low voltage auxiliary load 206.

<Third Modification>

Figure 8:
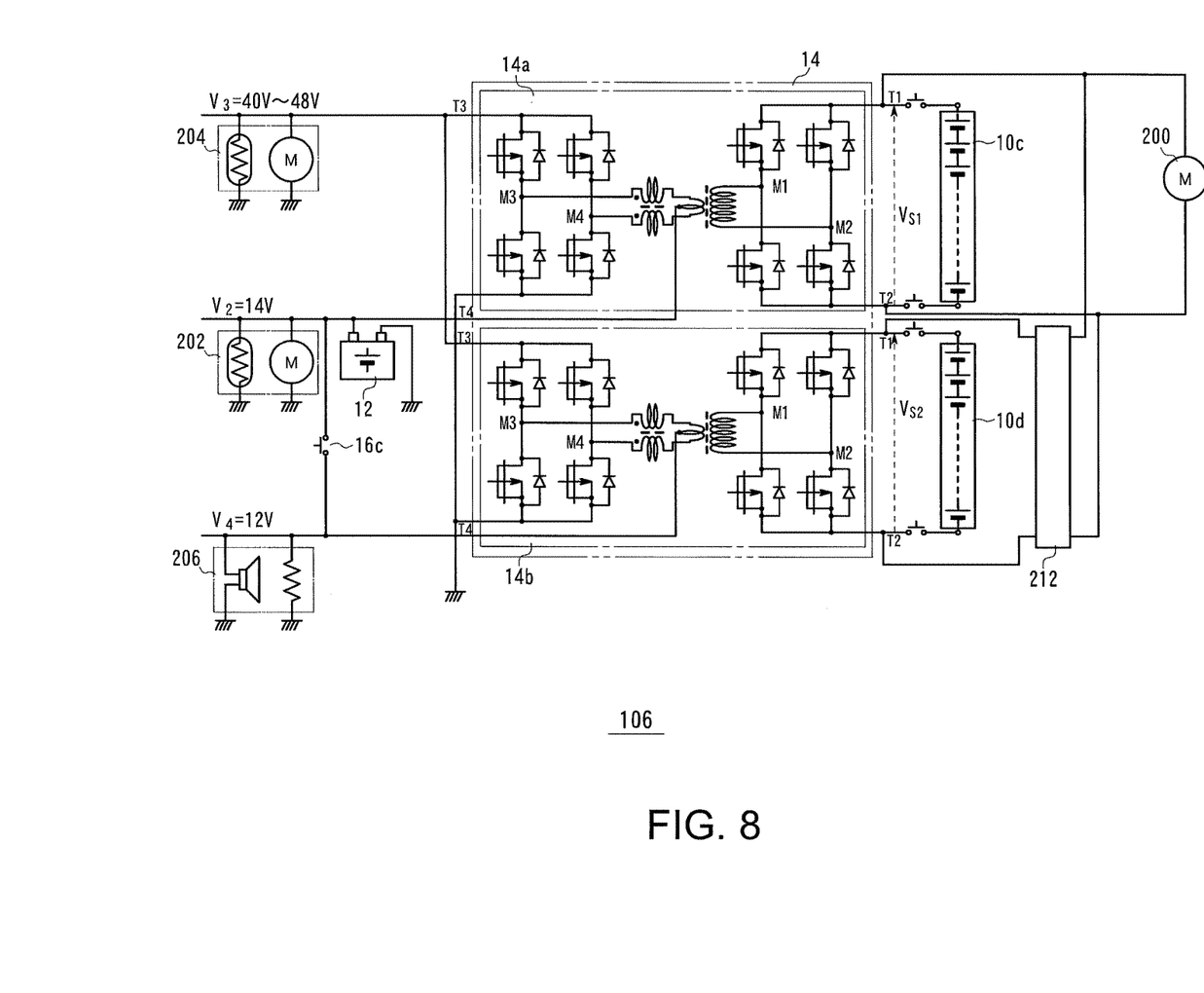
FIG. 8 is a circuit diagram illustrating a configuration of a power supply system according to a third modification of the present invention.

FIG. 8 is a circuit diagram illustrating a configuration of a power supply system 106 according to a third modification of the present invention. The power supply system 106 is configured such that the first sub-power supply 10a and the second sub-power supply 10b on the high voltage side are replaced with power supplies 10c and 10d respectively, each having a different output voltage from each other. In this case, at least one of the power supplies 10c and 10d includes a power converter 212 that supplies power to a motor generator 200. FIG. 8 illustrates an example in which the power converter 212 is provided in the power supply 10d, but may be provided in the power supply 10c or may be provided in both the power supplies 10c and 10d.

Such a configuration allows power to be supplied from a plurality of power supplies of different voltage for mutual exchange of power while maintaining redundancy of the power supplies on the low voltage side.

What is claimed is:

1. A power supply system comprising a power conversion circuit, the power conversion circuit being configured to:
bidirectionally send and receive power by bidirectional voltage conversion between a first power supply and a second power supply, the first power supply outputting a first voltage and the second power supply outputting a second voltage different from the first voltage;
convert the first voltage output from the first power supply to output a third voltage different from the first voltage and the second voltage and to output a fourth voltage different from the first voltage, the second voltage, and the third voltage; and
convert the second voltage output from the second power supply to output the third voltage and the fourth voltage,
wherein the first power supply comprises a first sub-power supply and a second sub-power supply,
wherein the power conversion circuit comprises:
a first sub-power conversion circuit configured to perform bidirectional voltage conversion between the first sub-power supply and the second power supply to convert a voltage output from the first sub-power supply to output the third voltage to the second power supply; and
a second sub-power conversion circuit configured to perform bidirectional voltage conversion between the second sub-power supply and the second power supply to convert a voltage output from the second sub-power supply to output the fourth voltage to the second power supply, and
wherein the first sub-power conversion circuit and the second sub-power conversion circuit are configured to bidirectionally send and receive power between the first sub-power supply.

2. The power supply system according to claim 1,
wherein at least one of the first sub-power conversion circuit and the second sub-power conversion circuit comprises:
a first bidirectional buck-boost circuit including a first switching circuit connected between a first DC power supply and a primary winding of a transformer; and
a second bidirectional buck-boost circuit including a second switching circuit connected between an output terminal of the third voltage and a secondary winding of the transformer, wherein the at least one of the first sub-power conversion circuit and the second sub-power conversion circuit performs voltage conversion between an output voltage of the first DC power supply and the third voltage.

3. The power supply system according to claim 1, wherein the third voltage is higher than the second voltage, that is, an output voltage from the second power supply,
the first sub-power conversion circuit is capable of boosting the second voltage from the second power supply to output the third voltage, and
the second sub-power conversion circuit is capable of converting the voltage from the second sub-power supply to output the third voltage.

4. The power supply system according to claim 2, wherein the third voltage is higher than the second voltage, that is, an output voltage from the second power supply,
the first sub-power conversion circuit is capable of boosting the second voltage from the second power supply to output the third voltage, and
the second sub-power conversion circuit is capable of converting the voltage from the second sub-power supply to output the third voltage.

5. The power supply system according to claim 1, wherein the fourth voltage is lower than the second voltage,
the first sub-power conversion circuit is capable of converting the voltage from the first sub-power supply to output the fourth voltage, and
the first sub-power conversion circuit and the second sub-power conversion circuit are capable of lowering the second voltage to output the fourth voltage.

6. The power supply system according to claim 2, wherein
the fourth voltage is lower than the second voltage,
the first sub-power conversion circuit is capable of converting the voltage from the first sub-power supply to output the fourth voltage, and
the first sub-power conversion circuit and the second sub-power conversion circuit are capable of lowering the second voltage to output the fourth voltage.

7. The power supply system according to claim 3, wherein
the fourth voltage is lower than the second voltage,
the first sub-power conversion circuit is capable of converting the voltage from the first sub-power supply to output the fourth voltage, and
the first sub-power conversion circuit and the second sub-power conversion circuit are capable of lowering the second voltage to output the fourth voltage.

8. The power supply system according to claim 1, further comprising:
a circuit breaker between the first sub-power supply and a first bidirectional buck-boost circuit of the first sub-power conversion circuit, and
a circuit breaker between the second sub-power supply and a first bidirectional buck-boost circuit of the second sub-power conversion circuit.

9. The power supply system according to claim 1, wherein
the first sub-power supply and the second sub-power supply are each configured by dividing the first power supply including a plurality of batteries connected in series.

10. The power supply system according to claim 2, wherein
the first sub-power supply and the second sub-power supply are each configured by dividing the first power supply including a plurality of batteries connected in series.

11. The power supply system according to claim 3, wherein
the first sub-power supply and the second sub-power supply are each configured by dividing the first power supply including a plurality of batteries connected in series.

12. The power supply system according to claim 5, wherein
the first sub-power supply and the second sub-power supply are each configured by dividing the first power supply including a plurality of batteries connected in series.

13. The power supply system according to claim 8, wherein
the first sub-power supply and the second sub-power supply are each configured by dividing the first power supply including a plurality of batteries connected in series.

14. The power supply system according to claim 1, wherein
the power supply system adjusts power balance between the first sub-power supply and the second sub-power supply by sending and receiving power between the first sub-power supply and the second sub-power supply.

15. The power supply system according to claim 2, wherein
the power supply system adjusts power balance between the first sub-power supply and the second sub-power supply by bidirectionally sending and receiving power between the first sub-power supply and the second sub-power supply.

16. The power supply system according to claim 3, wherein
the power supply system adjusts power balance between the first sub-power supply and the second sub-power supply by bidirectionally sending and receiving power between the first sub-power supply and the second sub-power supply.

17. The power supply system according to claim 5, wherein
the power supply system adjusts power balance between the first sub-power supply and the second sub-power supply by bidirectionally sending and receiving power between the first sub-power supply and the second sub-power supply.

18. The power supply system according to claim 8, wherein
the power supply system adjusts power balance between the first sub-power supply and the second sub-power supply by bidirectionally sending and receiving power between the first sub-power supply and the second sub-power supply.

* * * * *